(12) United States Patent
Rhetat et al.

(10) Patent No.: US 8,096,436 B2
(45) Date of Patent: Jan. 17, 2012

(54) PRESSURE COOKER WITH OVERPRESSURE SAFETY DEVICE

(75) Inventors: Eric Jacques Rhetat, Dijon (FR); Nathalie Bouye, Langres (FR)

(73) Assignee: SEB S.A., Ecully (FR)

( * ) Notice: Subject to any disclaimer, the term of this patent is extended or adjusted under 35 U.S.C. 154(b) by 565 days.

(21) Appl. No.: 12/255,285

(22) Filed: Oct. 21, 2008

(65) Prior Publication Data

US 2009/0101643 A1  Apr. 23, 2009

(30) Foreign Application Priority Data

Oct. 23, 2007 (FR) ...................................... 07 07407

(51) Int. Cl.
*B65D 51/16* (2006.01)
*B65D 45/00* (2006.01)
*A47J 27/00* (2006.01)
*A47J 27/08* (2006.01)
*A47J 36/00* (2006.01)

(52) U.S. Cl. ......... 220/203.19; 220/203.01; 220/203.09; 220/316; 220/378; 220/573.1; 99/337

(58) Field of Classification Search .................. 220/202, 220/203.01, 203.09, 203.19, 203.22, 303, 220/316, 324, 378, 912; 99/337
See application file for complete search history.

(56) References Cited

U.S. PATENT DOCUMENTS

2005/0132895 A1* 6/2005 Seurat Guiochet et al. .... 99/337
* cited by examiner

*Primary Examiner* — Anthony Stashick
*Assistant Examiner* — Madison L Wright
(74) *Attorney, Agent, or Firm* — Thomas, Kayden, Horstemeyer & Risley, LLP

(57) ABSTRACT

The invention relates to a pressure cooking appliance (1) having:
  a bowl (2) with a side wall (2B),
  a lid (3),
  a sealing gasket (4) interposed between the side wall (2B) and the lid (3),
  said appliance (1) being designed so that, when the pressure inside the chamber reaches a predetermined safety value, the gasket (4) moves up to reach a safety position, said appliance (1) being characterized in that the side wall (2B) comprises a geometrical irregularity (10) intended to interact with the gasket (4) when the latter is located at the predetermined safety position thereof so as to interrupt the contact between the gasket (4) and the side wall (2B).

12 Claims, 4 Drawing Sheets

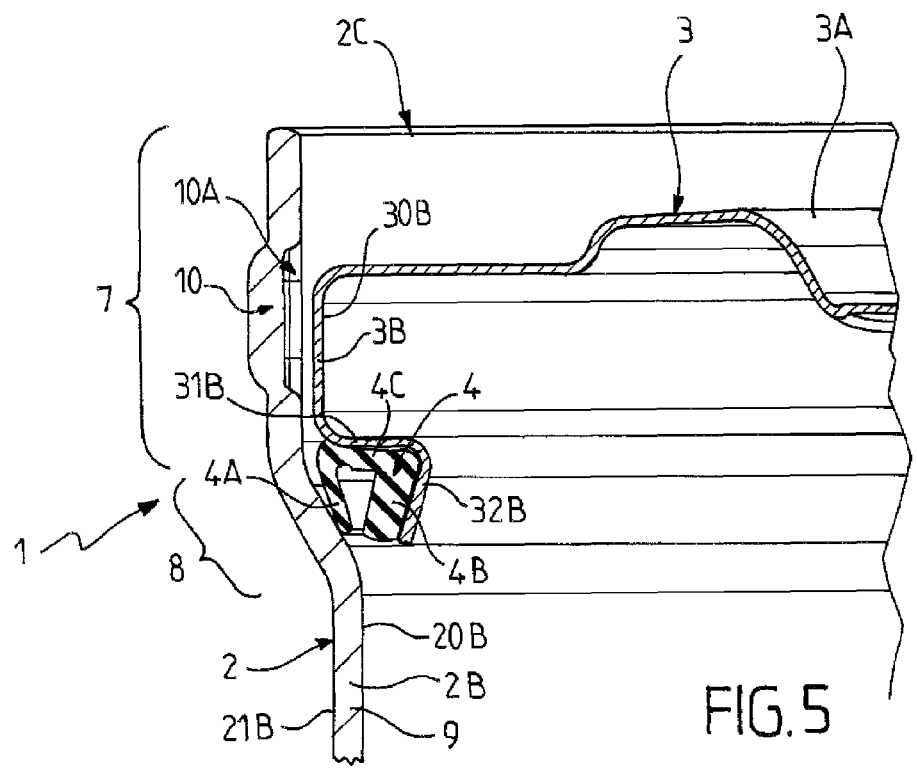
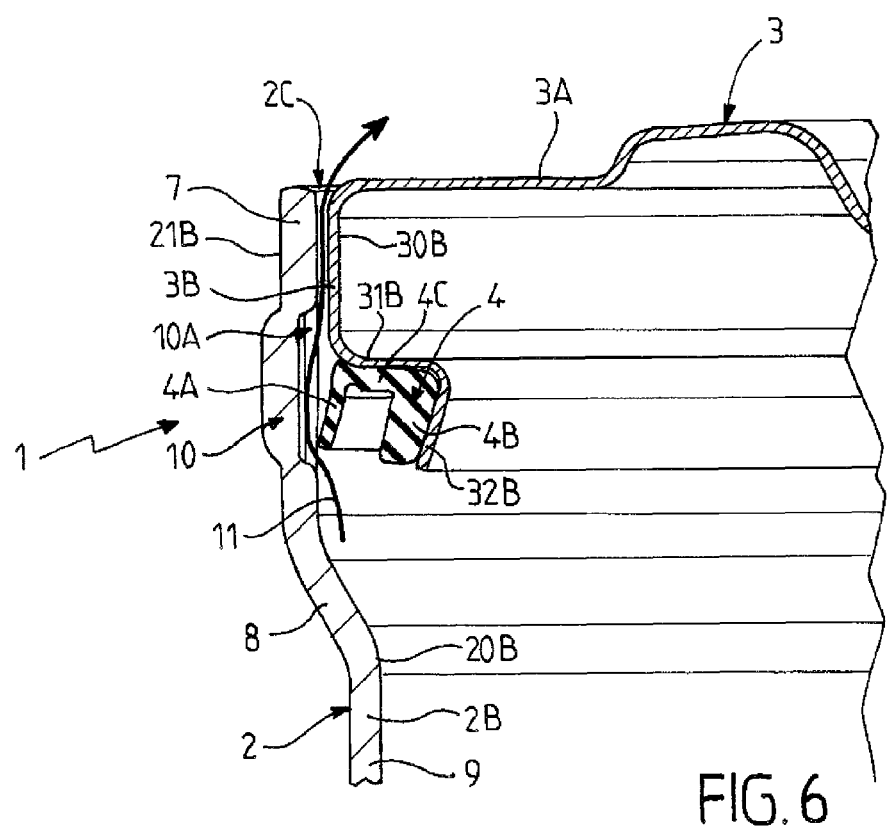

PRESSURE COOKER WITH OVERPRESSURE SAFETY DEVICE

CROSS REFERENCE RELATED APPLICATIONS

This application claims priority to copending French Patent Application No. 07 07407 filed Oct. 23, 2007, which is entirely incorporated herein by reference.

The present invention relates to the general technical field of kitchen utensils of the cooking-vessel type, and in particular to the sector of household appliances for cooking food under pressure, intended to cook food contained therein under steam pressure, such as pressure cookers.

More particularly, the present invention relates to a household appliance for cooking food under pressure, comprising:
- a bowl with a bottom and a side wall rising up from said bottom and circumscribing an opening,
- a lid intended to be associated with the bowl to form therewith a cooking chamber,
- a sealing gasket interposed between the side wall and the lid, said gasket being designed to be in contact with the side wall as long as the pressure inside the chamber does not exceed a predetermined safety value, so as to impart a substantial leaktightness to the cooking chamber, said appliance being designed so that, when the pressure inside the chamber reaches the predetermined safety value, the gasket moves at least locally relative to the side wall up to reach a predetermined safety position.

Household pressure cooking appliances, of the pressure cooker kind, are well known.

These appliances generally comprise a bowl with a bottom from which rises up a side wall. The bottom and the side wall define together a vessel opened at the upper end thereof, intended to receive the food to be cooked. These known appliances also comprise a lid intended to be locked relative to the bowl, at the upper end of the latter.

A sealing gasket in the form of an elastomeric circular piece conforming the shape of the interface between the bowl and the lid allows to form a substantially leaktight cooking chamber, i.e. a chamber which, on the one hand, is sealed enough to allow a pressure rising inside the chamber, and on the other hand, communicates with the outside only in a controlled manner, through members provided to that end, such as a pressure regulating valve for example.

These known appliances are generally intended to work in high inner pressure ranges liable to develop a considerable destructive power. That is why these appliances are usually provided with an overpressure safety valve intended to allow a decompression of the chamber in case of failure of the regulating valve (if, for example, this latter becomes obstructed or stuck), to avoid any explosion of the chamber under the effect of an excessive increase of the inner pressure.

To guarantee a maximum safety for the user, it is preferable to provide redundant safety means, i.e. to provide these pressure cooking appliances not only with an overpressure safety valve but also with an additional overpressure safety means able to cause a decompression of the chamber when both the regulating valve and the overpressure safety valve fail.

In particular, it is known to cause a steam leakage at the gasket when the pressure reaches an abnormal level beyond which the user's safety is liable to be endangered.

To that end, for example, so-called "gasket extrusion" systems are known, according to which a window is provided into the lid opposite to the sealing gasket so that, under the overpressure effect, the gasket goes through the window (which is referred to as "extrusion" of the gasket) which entails a loss of tightness and thus a decompression of the chamber. Pressure cookers are also known which associate a hole arranged into the lid and a sealing gasket having a local weakening so that as long as the pressure inside the chamber is lower that a predetermined safety value the gasket masks the hole, and that as soon as the pressure exceeds the predetermined safety value the gasket locally deforms to clear the hole and so authorize a chamber decompression leakage through said hole.

These known constructive arrangements are certainly satisfactory from the user's safety point of view but suffer from several drawbacks and in particular the following ones.

Firstly, the above-described prior art solutions are essentially based on a specific behaviour of the elastomeric piece forming the sealing gasket. It implies in particular, so as to obtain a sufficiently reliable and repetitive result, to precisely control, on the one hand, the physicochemical characteristics of the elastomeric material forming the gasket, and on the other hand, also the manufacturing tolerances of the various parts forming the pressure cooker, said parts further having to have specific geometrical characteristics which can prove restricting according to the shape and the purpose intended to be given to the appliance.

This known overpressure ultimate safety principle eventually needs a specific and relatively complex adjustment for each pressure cooker model. In other words, the above-mentioned technical arrangements implemented in the prior art prove complex to adjust and rather difficult and uneconomical to industrialize.

Moreover, the above-described overpressure safety principles are not directly adaptable to certain types of pressure cookers, in particular to pressure cookers with a recessed lid. Recessed-lid pressure cookers have the particularity of having a lid provided with a falling annular edge intended to be inserted inside the bowl, opposite to the inner face of the side wall of said bowl. In these pressure cookers, the sealing gasket hugs the falling edge, so that said gasket is interposed between the side wall and the falling edge. More precisely, recessed-lid pressure cookers are known the side wall of which widens upward, i.e. with a substantially tapered shape in upper part intended to form a bearing area for the sealing gasket. The gasket of these known appliances hugs the falling edge of the lid and squeezes against the inner face of the tapered portion of the side wall so as to form a leaktight cooking chamber. This known pressure cooker is designed so that the lid thereof undergoes, under an overpressure effect, an upward deformation tending to move it away from the bottom of the bowl. Under an overpressure effect, the lid thus tends to move away from the bowl, dragging with it the sealing gasket which surrounds the falling edge thereof. When the pressure reaches a predetermined safety value, the lid is deformed enough to entail a loss of contact between the gasket and the side wall, this loss of contact allowing a steam leakage from the inside to the outside of the chamber, said leakage allowing the pressure level inside the chamber to be stabilized and limited.

This technical arrangement, while being still satisfactory from the user's safety point of view, is nevertheless also essentially based on the gasket behaviour, and thus in particular on the control of the physicochemical characteristics of the latter, with all the resulting drawbacks as explained hereinabove.

Moreover, to be reliable and repetitive, this overpressure safety principle needs a particularly significant deformation of the lid to compensate the rather imprecise, unreliable and non-repetitive nature of the deformation behaviour of the elastomeric gasket. However, this high deformability of the lid necessary to obtain a perfectly reliable overpressure safety function entails a not insignificant drawback during normal operation. Indeed, because of this high deformability, the lid deformation is substantial even in normal pressure ranges, i.e. it is in any case significant enough to be noticed by the user. Such a deformation during normal operation, while being fully acceptable from a technical point of view, is nonetheless a serious disadvantage because it is liable to worry the user, which is of course particularly regrettable bearing in mind that these appliances are consumer goods.

To be reached, the high deformability required for the lid further needs a specific design of appliance assembly, with in particular a means for locking the lid onto the bowl, that form a flexible enough link between the bowl and the lid. Implementing the above-described overpressure ultimate safety means thus imposes significant design constraints and, in particular, forbids the implementation of a lid locking means forming a more rigid link than that of the prior art.

Consequently, the objects assigned to the invention are to remedy the various above-mentioned drawbacks and to provide a novel household appliance for cooking food under pressure that offers an excellent overall safety of use and that is of simple design, reliable, easy to industrialize and cheap.

Another object of the invention is to provide a novel household appliance for cooking food under pressure that has an overpressure ultimate safety function with a particularly precise and repetitive nature.

Another object of the invention is to provide a novel household appliance for cooking food under pressure the general design of which is based on simple and proven principles.

Another object of the invention is to provide a novel household appliance for cooking food under pressure the design of which is particularly simple, robust and cheap.

Another object of the invention is to provide a novel household appliance for cooking food under pressure the operation of which is not anxiety provoking for the user.

The objects assigned to the invention are achieved with the help of a household appliance for cooking food under pressure, comprising:

a bowl with a bottom and a side wall rising up from said bottom and circumscribing an opening,
a lid intended to be associated with the bowl to form therewith a cooking chamber,
a sealing gasket interposed between the side wall and the lid, said gasket being designed to be in contact with the side wall as long as the pressure inside the chamber does not exceed a predetermined safety value, so as to impart a substantial leaktightness to the cooking chamber, said appliance being designed so that, when the pressure inside the chamber reaches the predetermined safety value, the gasket moves at least locally relative to the side wall up to reach a predetermined safety position, said appliance being characterized in that, on the one hand, said lid (3) comprises a main body (3A) from which and at the periphery of which extends a falling edge (3B), the falling edge (3B) being designed to be disposed inside the bowl (2) and to be surrounded by the side wall (2B) when the lid (3) is fitted onto the bowl (2), and on the other hand, the side wall comprises at least a geometrical irregularity designed to interact with the gasket when the latter is located at the predetermined safety position thereof so as to interrupt, near the irregularity, the contact between the gasket and the side wall and thus to authorize a steam leakage from the inside to the outside of the chamber.

Other features and advantages of the invention will appear and be seen in greater detail from the following description, with reference to the appended drawings given only by way of illustrative and non-limiting example, and in which:

FIG. 5 is a schematic cross-sectional view showing the positioning of the gasket relative to the bowl and to the lid, when the pressure value inside the chamber is in a normal operating range;

FIG. 6 is a schematic cross-sectional view showing the interaction of the gasket with the geometrical irregularity provided on the side wall, when the pressure reaches the predetermined safety value.

Figure 1:
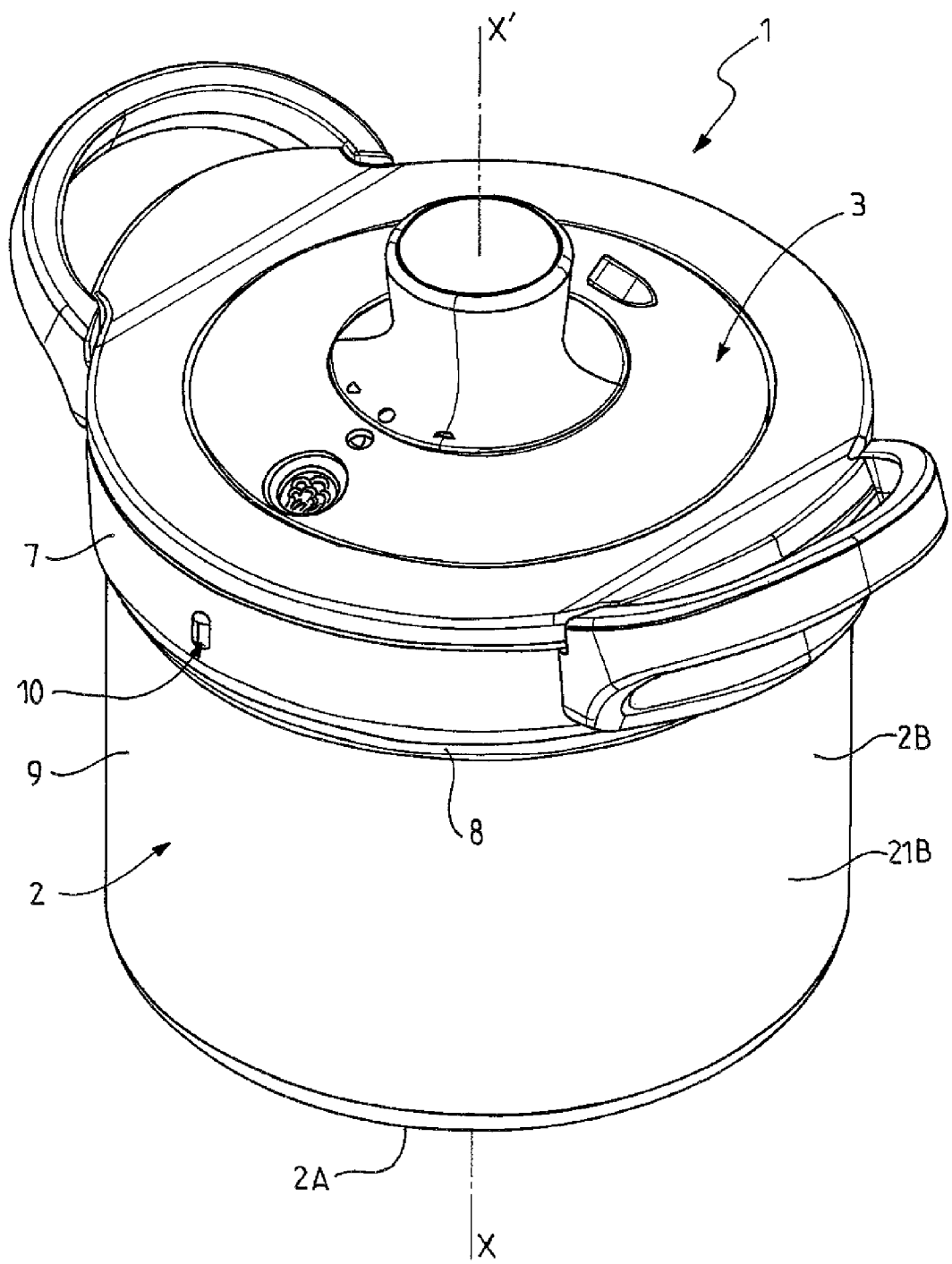
FIG. 1 is a general perspective view of a household pressure cooker in accordance with the invention.

The invention relates to a pressure cooking appliance 1 intended to cook food (for example vegetables, fruits, meat or fish) under pressure, in a household context. Household appliance 1 for cooking food under pressure preferably consists of a pressure cooker.

According to the invention, appliance 1 comprises a bowl 2 forming a cooking vessel and having advantageously a substantially rotational symmetry about an axis X-X'. Hereinafter, the adjective "axial" will refer to the direction of this symmetry axis X-X', direction which is similar to the vertical direction during normal operating conditions of the appliance. For example and in a classical manner, bowl 2 is made through drawing of a sheet metal blank, such as aluminium or stainless steel.

Bowl 2 is provided with a bottom 2A, preferably substantially flat, intended to rest on a heating means, such as a cooking plate for example. Bowl 2 also comprises a side wall 2B rising up from bottom 2A, at the periphery of the latter.

Preferably and as illustrated in drawings, side wall 2B runs generally vertically from bottom 2A, between a lower end attached to bottom 2A and a free upper end circumscribing an upper opening 2C for access to the inside of bowl 2 to allow in particular introduction of food into bowl 2. Advantageously, said side wall 2B runs mainly according to an axis parallel to axis X-X'. In other words, said side wall 2A has a substantially vertical running axis, parallel to axis X-X'. In the example illustrated in drawings, bottom 2A has a disc-shape and side wall 2B a substantially annular shape of revolution, said side wall 2B having an inner face 20B running opposite to the inside of bowl 2 and an opposite outer face 21B facing the outside of appliance 1.

Household appliance 1 according to the invention also comprises a lid 3 intended to be associated with bowl 2 to form therewith a cooking chamber. To that end, lid 3 is designed so as to close, when associated with bowl 2, upper opening 2C circumscribed by the free upper edge of side wall 2B.

Lid 3 is preferably made of a metallic material such as aluminium or stainless steel. In the preferential example illustrated in drawings, lid 3 has an overall disc-shape complementary to that of bowl 2.

According to the invention, household cooking appliance 1 further comprises a sealing gasket 4 which has advantageously an annular shape with X-X' as symmetry axis, and which is interposed between side wall 2B of bowl 2 and lid 3, as illustrated in drawings.

Sealing gasket 4 is preferably made of elastomeric material and has advantageously a flexible and elastic nature.

Sealing gasket 4 is designed to be in contact with side wall 2B as long as the pressure inside the chamber formed by bowl 2 and lid 3 does not exceed a predetermined safety value, so as to form a substantially leaktight cooking chamber, i.e. a chamber sealed enough to allow pressure inside the chamber to rise and to be maintained.

The predetermined safety value corresponds to a pressure level beyond which the operation of cooking appliance 1 is abnormal and is liable to present a risk to the user. As long as the inner pressure inside the cooking chamber is lower than this predetermined safety value, sealing gasket 4 is in sealing contact on the one hand with side wall 2B and on the other hand with lid 3, such that the pressure inside the chamber can be far greater than atmospheric pressure, and for example exceed said atmospheric pressure by a value greater or equal to 10 kPa, and preferably greater or equal to 20 kPa. To allow a very fast and efficient cooking, it is also fully conceivable for the chamber to be designed so that the inner pressure thereof can exceed atmospheric pressure by a value substantially between 40 and 110 kPa, and preferably substantially between 50 and 100 kPa.

Advantageously, household appliance 1 according to the invention comprises a pressure regulating means, of the valve kind, arranged to maintain the relative pressure inside the chamber at a substantially constant predetermined value called "operating pressure". Preferably, appliance 1 further comprises a safety valve intended to guarantee stabilisation and limitation of the pressure inside the appliance 1 in case of failure of the regulating valve.

Lid 3 can be locked onto bowl 2 to allow a pressure rising inside the chamber without inadvertent escape of lid 3 under the pressure effect. To that end, appliance 1 advantageously comprises a means 5 for locking lid 3 onto bowl 2, designed to fasten lid 3 to bowl 2.

Means 5 for locking lid 3 onto bowl 2 can be of any type known to the person skilled in the art and is preferably designed to locally fasten lid 3 to bowl 2 in a plurality of fastening areas 6, said areas 6 being preferably localized, i.e. they does not extend on the whole circumference of upper opening 2C. Preferably, locking means 5 is a user-engageable/disengageable locking means, i.e. it is able to move between a locking configuration of lid 3 relative to bowl 2 (illustrated in FIG. 3) in which lid 3 is integral with bowl 2, and an unlocking configuration of lid 3 relative to bowl 2 (notably illustrated in FIG. 4) in which the lid can be freely separated from bowl 2, through a manual operation of the user.

Figure 3:
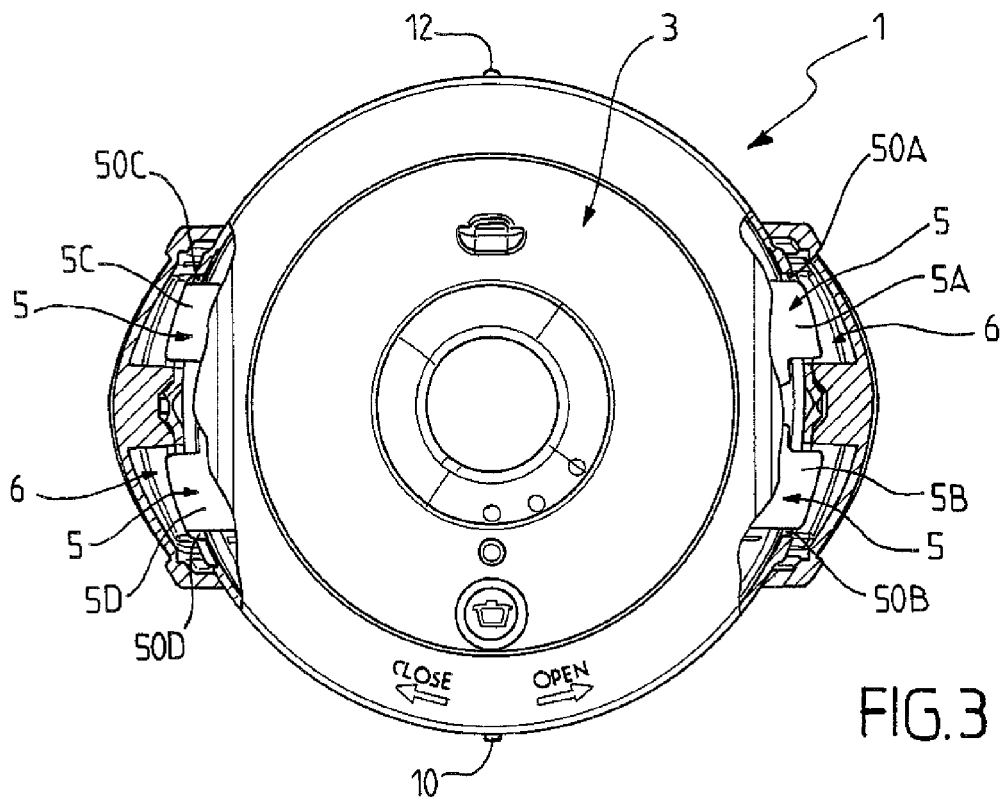
FIG. 3 is a partially cross-sectional plan view of the pressure cooker of FIGS. 1 and 2 with the lid fitted and locked onto the bowl.
Figure 4:
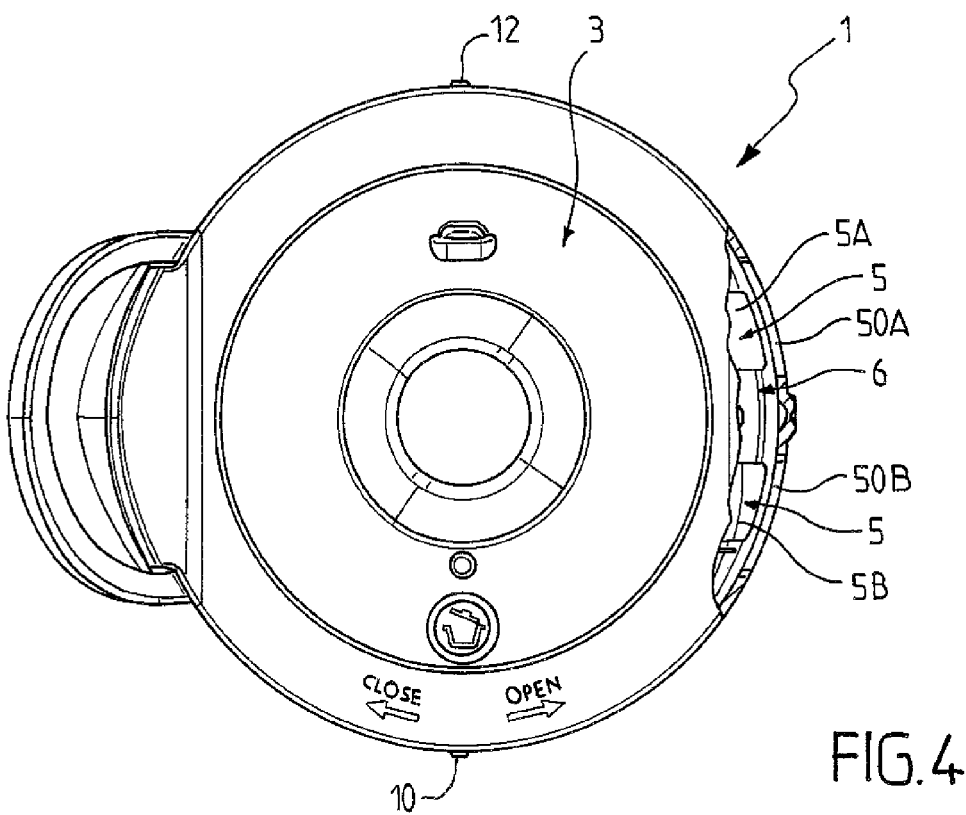
FIG. 4 is a partially cross-sectional plan view of the pressure cooker of FIGS. 1 to 3 with the lid fitted and unlocked onto the bowl.

Preferably, locking means 5 comprises at least one locking element 5A, 5B, 5C, 5D moveably mounted on lid 3, substantially through radial translation relative to symmetry axis X-X' between a linked locking position illustrated in FIG. 3 and a linked unlocking position illustrated in FIG. 4. According to the preferred embodiment illustrated in drawings, locking elements 5A, 5B, 5C, 5D respectively consist of locking bolts coupled by pairs, said bolt pairs being positioned diametrically opposite relative to each other about the general symmetry axis X-X' of appliance 1, as illustrated in drawings.

Locking openings 50A, 50B, 50C, 50D, complementary to bolts 5A, 5B, 5C, 5D, are provided into bowl 2, through side wall 2B, such that the locking operation of lid 3 corresponds to the latching of bolts 5A, 5B, 5C, 5D into the complementary openings 50A, 50B, 50C, 50D respectively (cf. FIG. 3), as a strike and bolt locking system, to substantially prevent any movement of lid 3 relative to bowl 2, while the unlocking operation of lid 3 corresponds to the retraction and unlatching of bolts 5A, 5B, 5C, 5D out of slots forming the corresponding openings 50A, 50B, 50C, 50D, so that said bolts 5A, 5B, 5C, 5D do not cooperate anymore with said slots 50A, 50B, 50C, 50D.

In particular, such a locking means based on the latching of locking segments (bolts) into complementary openings provided into the bowl is interesting from the mechanical point of view because it allows a particularly rigid, reliable and secured assembly of lid 3 onto bowl 2, while being in the same time particularly easy to operate.

However, means 5 for locking lid 3 onto bowl 2 is not limited to such a segment system and, alternatively, it can be based on other principles without in any way departing from the scope of the invention. For example, means 5 for locking lid 3 onto bowl 2 can be based on bayonet, jaw or clamp system.

Figure 2:
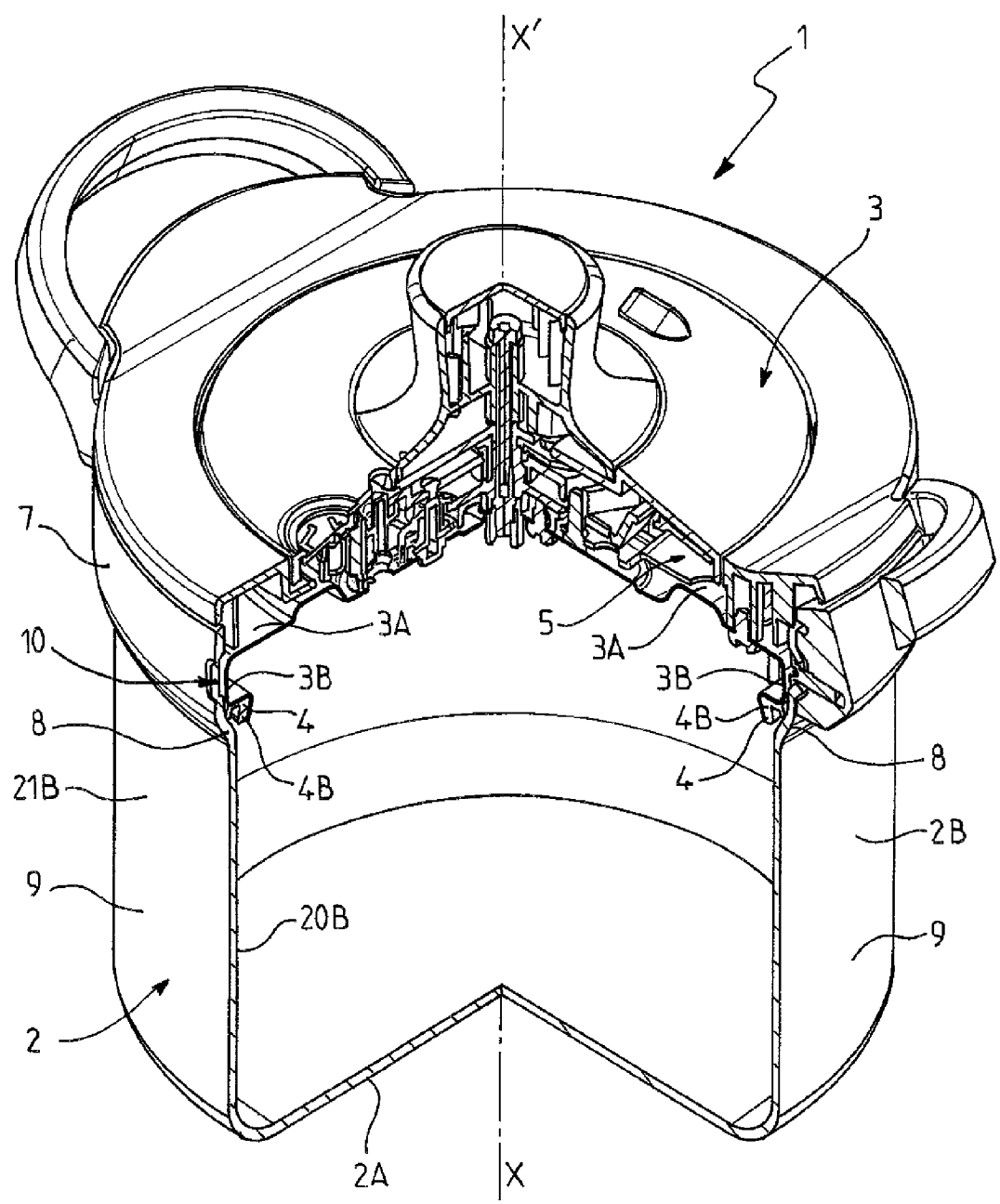
FIG. 2 is a general perspective view of the pressure cooker of FIG. 1, partially cut-away according two substantially perpendicular cutting planes.

As can be seen notably in FIGS. 2 and 5, sealing gasket 4 is designed to be in contact with inner face 20B of side wall 2B during a normal operation, i.e. when lid 3 is fitted onto bowl 2 and as long as the pressure inside the chamber does not exceed the predetermined safety value.

Preferably, and as illustrated in drawings, sealing gasket 4 is attached to lid 3, i.e. it is fitted onto said lid 3 so as to form therewith a unitary subsystem.

Advantageously, lid 3 comprises a main body 3A, with a substantially overall disc-shape, from which and at the periphery of which extends a falling edge 3B, sealing gasket 4 hugging said falling edge 3B. In other words, according to this preferred embodiment (illustrated in drawings), gasket 4 surrounds falling edge 3B in an elastic manner. As illustrated in drawings, main body 3A of lid 3 preferably runs wholly parallel to bottom 2A of bowl 2 when lid 3 is fitted onto bowl 2, while falling edge 3B runs vertically downward, i.e. wholly parallel to the general symmetry axis X-X' of appliance 1. Preferably, sealing gasket 4 surrounds falling edge 3B so that said gasket 4 is interposed between side wall 2B and falling edge 3B.

Advantageously, appliance 1 is a recessed-lid appliance, i.e. falling edge 3B is designed to be disposed inside bowl 2, as illustrated in FIGS. 5 and 6, and to be surrounded by side wall 2B when lid 3 is fitted onto bowl 2. In other words, during the closing operation of appliance 1, falling edge 3B is introduced into bowl 2 so as to be disposed opposite to inner face 20B of side wall 2B of said bowl 2. The invention is of course not in any way restricted to a recessed-lid and may implement any other lid type (conventional covering lid, lid for manhole, etc.).

In the example illustrated in drawings, the diameter of bowl 2 at upper opening 2C is slightly greater than that of lid 3 to allow complete introduction of the latter inside bowl 2. In order to form a sealed bearing surface for gasket 4, bowl 2 has a section restriction consisting for example of a tapered conformation of side wall 2B.

In the example illustrated in drawings, side wall 2B thus consists of a first straight portion 7 running vertically from the free edge of side wall 2B, said first straight portion 7 being extended downward by a tapered portion 8 converging toward the inside of bowl 2.

The tapered portion serves as a stop for sealing gasket 4, said gasket being intended to come in sealed bearing against said tapered portion 8. Tapered portion 8 is then itself extended downward by a second substantially straight portion 9 that runs vertically to bottom 2A of bowl 2.

The invention is of course not restricted to the implementation of a bowl 2 with a flared shape. It is for example fully conceivable for bowl 2 to have a straight shape, i.e. the side wall 2B thereof rise vertically in a substantially rectilinear manner, perpendicular to bottom 2A. In this case (not illustrated), the section restriction intended to form a bearing surface for gasket 4 can for example be formed by a localized circular deformation of side wall 2B, so as to provide a centripetal radial circular boss.

Advantageously and as illustrated in drawings, sealing gasket 4 has a U-shaped cross-section, the U-legs each forming a first and a second lips 4A, 4B, while the U-web forms the heel 4C of the gasket. In the embodiment illustrated in drawings, first lip 4A is intended to come in contact with side wall 2B, and more precisely with inner face 20B of side wall 2B, at the tapered portion 8, while second lip 4B is intended to come in contact with lid 3, and preferably to hug falling edge 3B. So as to provide a satisfactory holding in position of gasket 4 relative to lid 3, falling edge 3B has advantageously a conformation for the reception of gasket 4, formed in the following manner:

falling edge 3B runs from the periphery of main body 3A following a first substantially vertical portion 30B;

first vertical portion 30B is extended by an horizontal recessed edge 31B against the outer surface of which heel 4C of gasket 4 is intended to bear;

horizontal recessed edge 31B is itself extended by a terminal edge 32B which runs substantially downward and diagonally outward and forms a bearing area for second lip 4B of gasket 4.

According to the invention, appliance 1 is designed so that, when the pressure inside the chamber reaches the predetermined safety value, gasket 4 moves at least locally relative to side wall 2B up to reach a predetermined safety position, illustrated in FIG. 6. In other words, pressure cooker 1 is designed so that, under the effect of the moving force exerted by the pressure inside the chamber, gasket 4 leaves the normal operating configuration thereof (illustrated in FIG. 5) in which it provides a sealing contact between bowl 2 and lid 3 to move toward a predetermined safety configuration it reaches as soon as the pressure reaches the predetermined safety value representative of an abnormal operation of appliance 1, due for example to a failure of the regulating and safety valves. Of course, the movement of gasket 4 can only be local; in which case the gasket 4 shifts from the configuration thereof illustrated in FIG. 5 to that illustrated in FIG. 6 is made through a deformation of said gasket 4 and not through an overall movement of the latter.

In the embodiment illustrated in drawings, lid 3 is designed to move, at least locally, under the effect of pressure increasing inside the chamber, and to drag with it gasket 4 so as to bring the latter at the predetermined safety position thereof when said pressure reaches the predetermined safety value. In other words, under the effect of pressure increasing inside the chamber, lid 3 moves relative to side wall 2B, preferably substantially parallel to symmetry axis X-X', and drag with it sealing gasket 4 fitted onto it.

Preferably, the movement of lid 3 is a local movement, i.e. a deformation. For example, in the embodiment illustrated in drawings, the portion of lid 3 that is located near fastening areas 6 substantially does not undergo any movement, while on the contrary the areas of lid 3 that are the furthest from said fastening areas 6 bend upward, this localized flexion movement of lid 3 locally dragging gasket 4 upward. In other words, in the illustrated embodiment, gasket 4, when normally operating, bears through first lip 4A thereof against side wall 2B, following a wholly circular sealing line. Under the effect of pressure increasing, the areas of lid 3 that are the furthest from fastening areas 6 bend upward, and then locally drag gasket 4 upward (i.e. move it away from bottom 2A).

Consequently, in the example illustrated in drawings, the predetermined safety position of gasket 4 essentially depends on the mechanical flexion characteristics of lid 3, and thus on the physicochemical characteristics of the material forming said lid 3. For thermomechanical strength reasons, the material forming the lid is preferably metallic and the deformation behaviour thereof is thus greatly reliable, precise and repetitive.

According to the invention, side wall 2B comprises at least one geometrical irregularity 10 designed to interact with gasket 4 when the latter is at the predetermined safety position thereof (illustrated in FIG. 6) so as to interrupt, near irregularity 10, the contact between gasket 4 and side wall 2B and thus to authorize a steam leakage from the inside to the outside of the chamber. Said steam leakage is sufficient to allow at least limitation, and preferably stabilization, of the pressure value inside the chamber, so as to avoid the pressure to reach a value liable to lead to phenomenons harmful to the user.

The combined implementation of a geometrical irregularity disposed on side wall 2B and a lid 3 with a falling edge 3B disposed inside bowl 2 is particularly interesting because it allows to direct the steam leakage upward and not in directions (laterally and/or downward) liable to entail a danger for the user. Inner face 20B of side wall 2B and outer face 30C, 32C of falling edge 3B form indeed a vertical conduit 40 for outputting of steam.

Preferably, geometrical irregularity 10 is arranged on side wall 2B so as to be distant from the opening 2C of bowl 2, i.e. it is separated by a non-zero distance from the free upper edge of side wall 2B. In other words, geometrical irregularity 10 is designed to be separated from the opening 2C of bowl 2 by a preferably substantially vertical section 7A of the first straight portion 7 forming the upper part of side wall 2B. Further, geometrical irregularity 10 is advantageously disposed on a portion of side wall 2B running substantially vertically, for example preferably in first straight portion 7 of side wall 2B.

The positioning of irregularity 10 on side wall 2B at distance of the opening 2C of bowl 2 is particularly interesting in combination with the implementation of a recessed-edge lid 3B because it allows to create a substantially vertical bounded path for steam leakage between side wall 2B and falling edge 3B of lid 3, which avoids a direct steam leakage, possibly violent, or event dangerous to the user.

More precisely, using a lid 3 with a recessed-edge 3B on bowl 2 comprising a geometrical irregularity 10 located at distance from opening 2C allows to place the inside of bowl 2 in communication with the outside thereof, not directly but through the vertical conduit 40 located between outer face 30C, 32C of falling edge 3 and inner face 20B of side wall 2B.

Thus, the present invention also relates as such a household appliance 1 for cooking food under pressure, comprising:

a bowl 2 with a bottom 2A, a side wall 2B rising up from said bottom 2A and circumscribing an opening 2C, a lid 3 intended to be associated with bowl 2 to form therewith a cooking chamber, a sealing gasket 4 interposed between side wall 2B and lid 3, said gasket 4 being designed to be in contact with side wall 2B as long as the pressure inside the chamber does not exceed a predetermined safety value, so as to impart a substantial leaktightness to the cooking chamber, said appliance 1 being designed so that, when the pressure inside the chamber reaches the predetermined safety value, gasket 4 moves at least locally relative to side wall 2B up to reach a predetermined safety position, said appliance 1 being characterized in that side wall 2B comprises at least a geometrical irregularity 10, 12 arranged on said side wall 2B at distance from opening 2C of bowl 2 and intended to interact with gasket 4 when the latter is located at the predetermined safety position thereof so as to interrupt, near irregularity 10, 12, the contact between gasket 4 and side wall 2B and thus to authorize a steam leakage from the inside to the outside of the chamber.

The general principle of the invention is based on an overpressure ultimate safety obtained through cooperation between gasket 4 and a conformation singularity of side wall 2B of bowl 2, this cooperation entailing a loss of contact, at least locally, between gasket 4 and side wall 2B.

Through this loss of contact, the inside of the chamber is placed in communication with the outside, which allows a steam leakage to the outside, indicated by arrow 11 in FIG. 6.

Thus, in the example illustrated in drawings, when the pressure inside the chamber reaches the predetermined safety value, gasket 4 at least locally moves away from bottom 2A of bowl 2 so that at least a portion of said gasket 4 is located at a predetermined distance from said bottom 2A, geometrical irregularity 10 being positioned on side wall 2B, preferably on the predominantly vertical first straight portion 7 of side wall 2B, at a distance substantially corresponding to said predetermined distance, geometrical irregularity 10 being preferably also distant from opening 2C by a distance corresponding to the height of section 7A. In other words, the pressure increasing inside the chamber drag gasket 4 upward until the latter is opposite to geometrical irregularity 10, the positioning of gasket 4 and geometrical irregularity 10 in an opposite relation creating a passageway for the steam contained inside the cooking chamber toward the outside, which entails a decompression of appliance 1.

In the embodiment illustrated in drawings, appliance 1 comprises two geometrical irregularities 10, 12 positioned diametrically opposite relative to each other on side wall 2B, around the general symmetry axis X-X' of appliance 1. Preferably, each geometrical irregularity 10, 12 is positioned the furthest possible from fastening areas 6, so as to be located opposite to a portion of lid 3 that is liable to undergo the most significant possible deformation under the pressure effect.

For example, as illustrated in drawings, the two geometrical irregularities 10, 12 are preferably positioned angularly at 90° relative to fastening areas 6, so as to be located opposite to the portion of lid 3 that is liable to undergo the most significant possible deformations.

Preferably, each geometrical irregularity 10, 12 comprises at least a recess 10A provided into side wall 2B. Recess 10A is advantageously deep and localized enough so that, when gasket is opposite to said recess 10A, first lip 4A of said gasket cannot reach at least locally the bottom of recess 10A, i.e. so that it cannot conform everywhere the profile of recess 10, which entails a loss of sealing contact, as illustrated in FIGS. 5 and 6, and thus a localized steam leakage. In the example of appliance 1 illustrated in drawings, which comprises two diametrically opposite geometrical irregularities, a double loss of sealing contact may be obtained, which entails the creation of two localized steam leakage areas.

Advantageously, recess 10A is formed through a localized deformation of side wall 2B, from the inside of bowl 2 to the outside, as illustrated in drawings. Recess 10A is for example obtained through a squeezing operation made from inner face 20B of side wall 2B of bowl 2, thus allowing a sinking outward of said side wall 2B. Such a construction is of course of industrial and commercial interest because such a sinking operation is particularly simple, fast and cheap to make in the manufacturing industrial environment of bowl 2.

The invention is of course not restricted to the implementation of a recess forming a geometrical irregularity, and it is for example fully conceivable for the geometrical irregularity 10 to be formed by a little lump projecting from inner face 20B of side wall 2B, said little lump being high and localized enough so that gasket 4 cannot conform completely the contour, which thus entails a local loss of tightness.

Geometrical irregularity 10 can also be formed by an added-on piece or consists of a hole going through the whole thickness of side wall 2B. In the latter case, the hole is provided through side wall 2B so as, on the one hand, to be initially located outside the cooking chamber (above the sealing line of gasket 4 or on this line) as long as the pressure is lower than the predetermined safety value, and on the other hand, to be placed in communication with the inside of the cooking chamber when gasket 4 reaches locally the height corresponding to the predetermined safety position thereof. In this embodiment, it is preferable to provide the through-hole with a steam deflector so as to protect the user.

Eventually, the invention provides a particularly cheap overpressure ultimate safety means, inasmuch as the parts used to fulfil this function are anyway necessary for the construction of appliance 1, not any additional or specific part being fundamentally necessary.

Moreover, the invention is based on a specific mechanical behaviour of metallic parts that deform under pressure. Now, the deformation behaviour of metallic parts is far more precise, repetitive and predictive than the behaviour of an elastomeric gasket. Consequently, the predetermined pressure value at which the decompression leakage occurs can be controlled in a particularly precise and reliable manner because it is precisely not linked to specific characteristics of the elastomeric material forming gasket 4.

Geometrical irregularity 10 the positioning of which is controlled through design also allows to restrict the local deformation of lid 3 under the pressure effect. Indeed, as soon as gasket 4 is located opposite to recess 10A a steam leakage occurs, which entails a pressure drop and thus a return of lid 3 toward the normal operating position thereof illustrated in FIG. 5.

Thus, through positioning recess 10A in a place close enough, in elevation, to the normal bearing area of gasket 4 on side wall 2B, at distance from opening 2C of bowl 2, the deformation of lid 3 is restricted and is consequently rather or totally imperceptible by the user.

The invention claimed is:

1. Household appliance (1) for cooking food under pressure, comprising:
    a bowl (2) with a bottom (2A) and a side wall (2B) rising up from said bottom (2A) and circumscribing an opening (2C),
    a lid (3) intended to be associated with the bowl (2) to form therewith a cooking chamber, the cooking chamber having an inside between said bottom and said lid, wherein the outside is the ambient environment,
    a sealing gasket (4) interposed between the side wall (2B) and the lid (3), said gasket (4) being designed to be in contact with the side wall (2B) as long as the pressure inside the chamber does not exceed a predetermined safety value, so as to impart a substantial leaktightness to the cooking chamber,
    said appliance (1) being designed so that, when the pressure inside the chamber reaches the predetermined safety value, the gasket (4) moves at least locally relative to the side wall (2B) up to reach a predetermined safety position, said appliance (1) being characterized in that, on the one hand, said lid (3) comprises a main body (3A) having a periphery from which and at the periphery of which extends a falling edge (3B), the falling edge (3B) being designed to be disposed inside the bowl (2) and to be surrounded by the side wall (2B) when the lid (3) is fitted onto the bowl (2), and on the other hand, the side wall (2B) comprises at least a geometrical irregularity (10, 12) intended to interact with the gasket (4) when the latter is located at the predetermined safety position thereof so as to interrupt, near the irregularity (10, 12), the contact between the gasket (4) and the side wall (2B) and thus to authorize a steam leakage from the inside to the outside of the chamber.

2. The appliance (1) according to claim 1, in which said side wall (2B) has an inner face (20B) running opposite to the inside of the bowl (2), said sealing gasket (4) being designed to be in contact with said inner face (20B).

3. The appliance (1) according to claim 2, in which said sealing gasket (4) is attached to the lid (3).

4. The appliance (1) according to claim 3, in which said lid (3) is designed to move, at least locally, under the effect of pressure increasing inside the chamber, and to drag with it the gasket (4) so as to bring the latter at the predetermined safety position thereof when said pressure reaches the predetermined safety value.

5. The appliance (1) according to claim 1 in which said gasket (4) hugs said falling edge (3B).

6. The appliance (1) according to claim 1 in which said sealing gasket (4) has a U-shaped cross-section, the U-legs each forming a first and a second lips (4A, 4B), while the U-web forms the heel (4C) of the gasket (4), the first lip (4A) being intended to come in contact with the side wall (2B) while the second lip (4B) is intended to come in contact with the lid (3).

7. The appliance (1) according to claim 6, in which said second lip (4B) hugs the falling edge (3B).

8. The appliance (1) according to claim 1 in which when the pressure inside the chamber reaches the predetermined safety value, the gasket (4) at least locally moves away from the bottom (2A) of the bowl (2) so that at least a portion of said gasket (4) is located at a predetermined distance from said bottom (2A), the geometrical irregularity (10, 12) being positioned on the side wall (2B) at a distance corresponding to said predetermined distance.

9. The appliance (1) according to claim 1 in which each geometrical irregularity (10, 12) comprises at least a recess (10A) provided into the side wall (2B).

10. The appliance (1) according to claim 9, in which said recess (10A) is formed through a localized deformation of the side wall (2B), from the inside of the bowl (2) to the outside.

11. The appliance (1) according to claim 1 and including a means (5) for locking the lid (3) onto the bowl (2), designed to locally fasten the lid (3) to the bowl (2) in a plurality of fastening areas (6), each geometrical irregularity (10, 12) being positioned the furthest possible from the fastening areas (6).

12. The appliance (1) according to claim 1 in which said geometrical irregularity (10, 12) is arranged on the side wall (2B) at distance from the opening (2C) of the bowl (2).

* * * * *